C. R. BIRDSEY & C. F. HENNING.
PLASTER BLOCK MOLDING MACHINE.
APPLICATION FILED APR. 29, 1912.
1,116,669.
Patented Nov. 10, 1914.
5 SHEETS—SHEET 1.
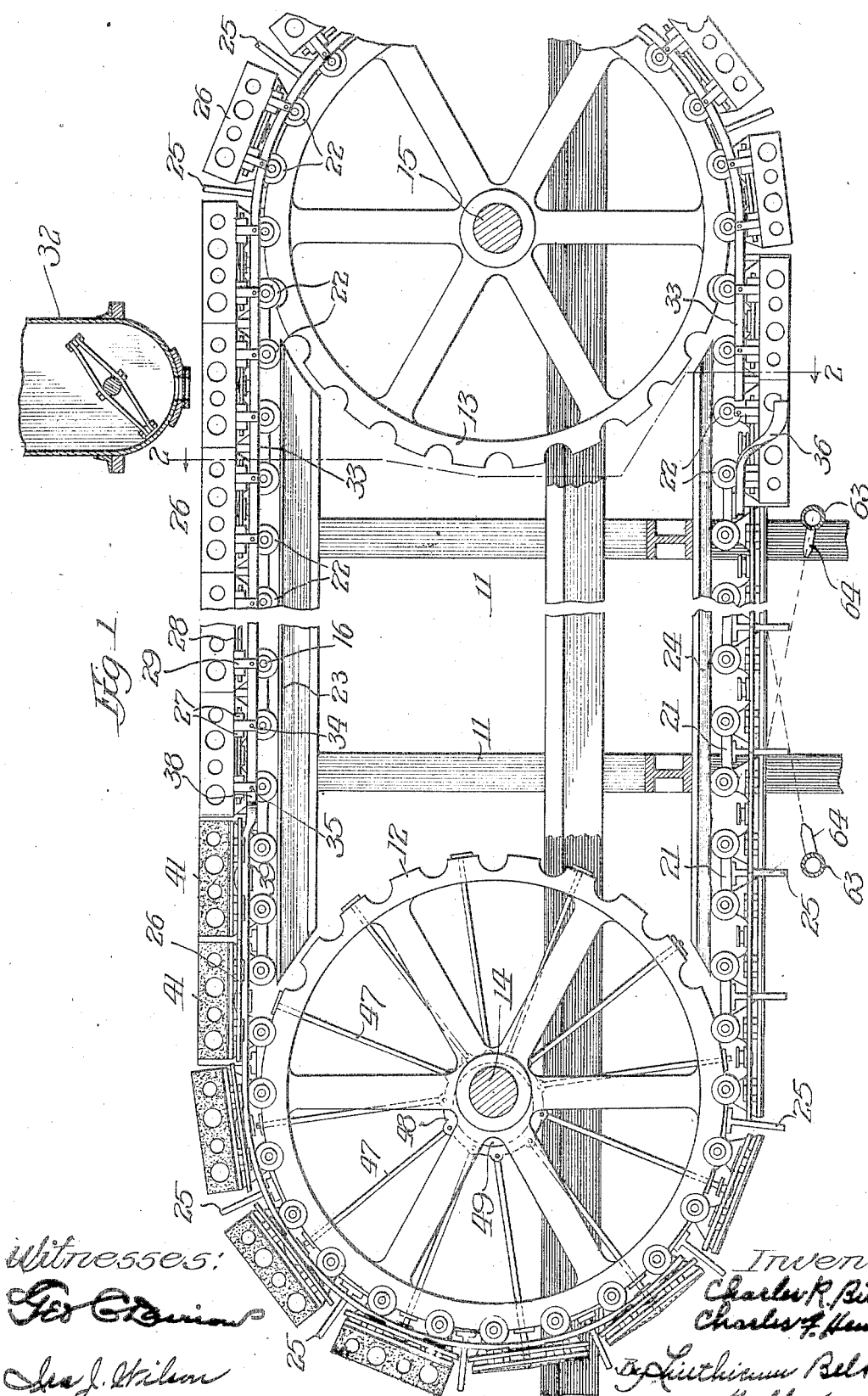

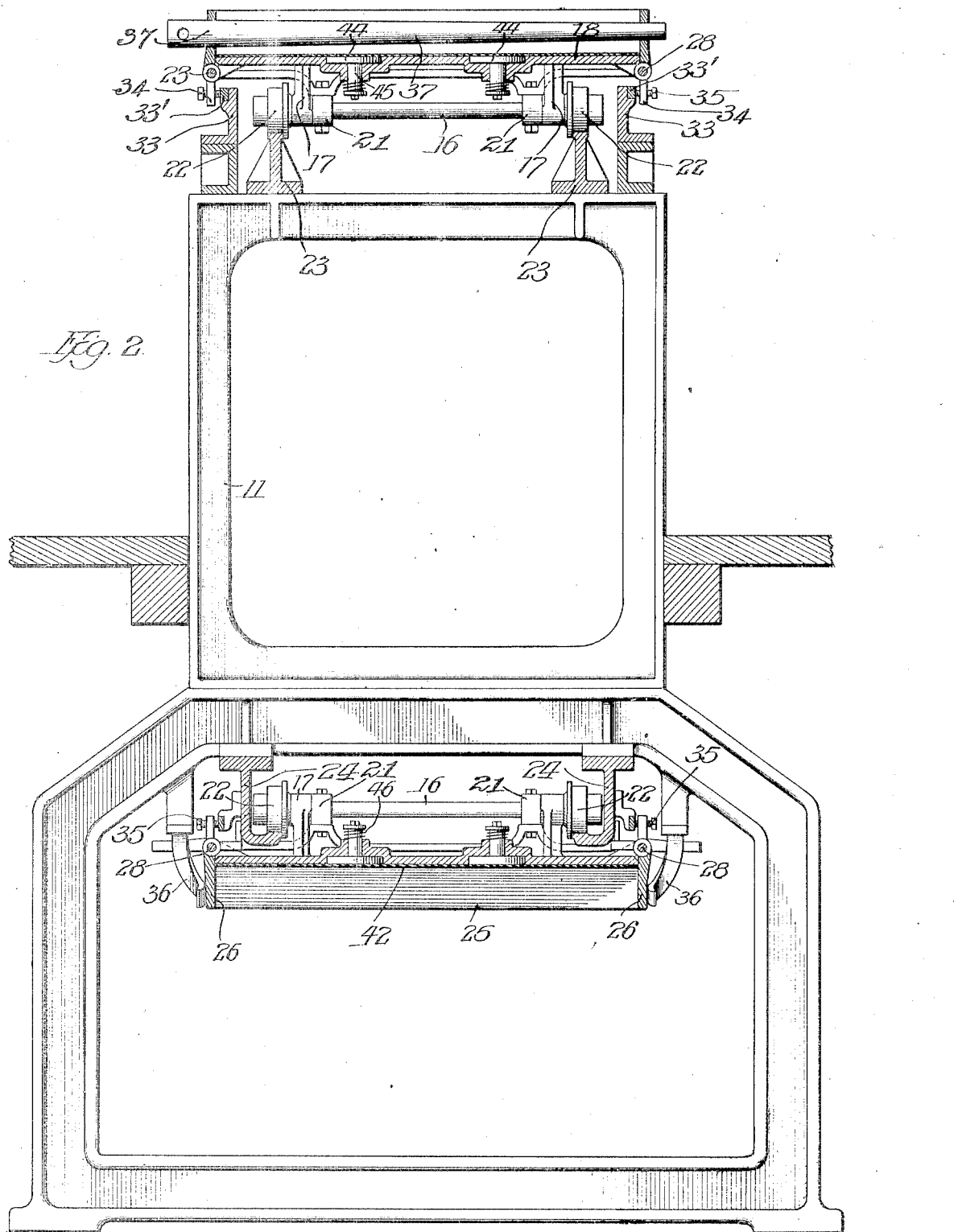

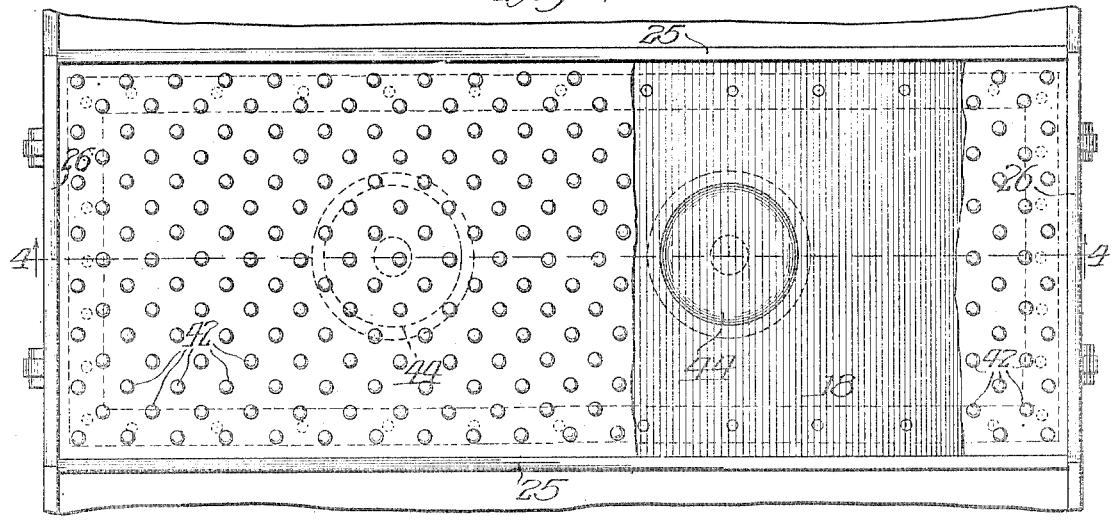
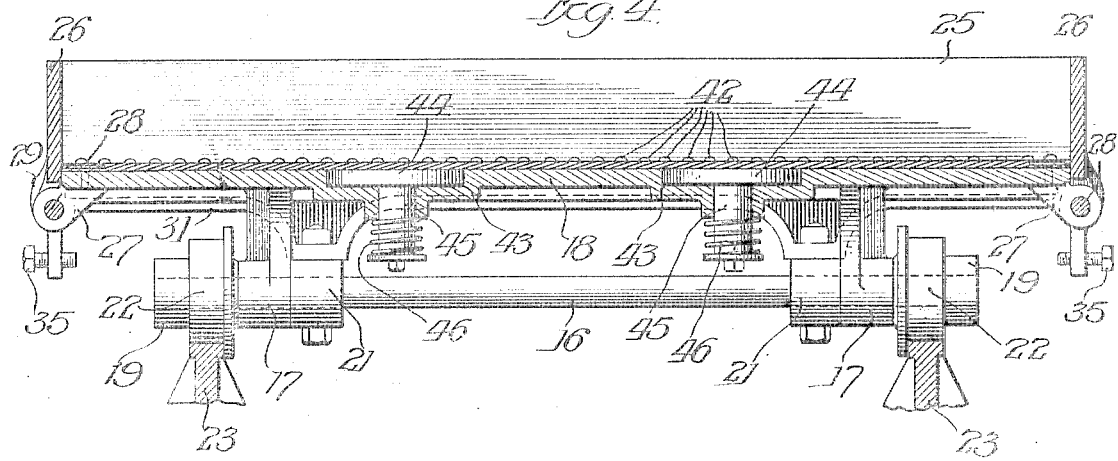
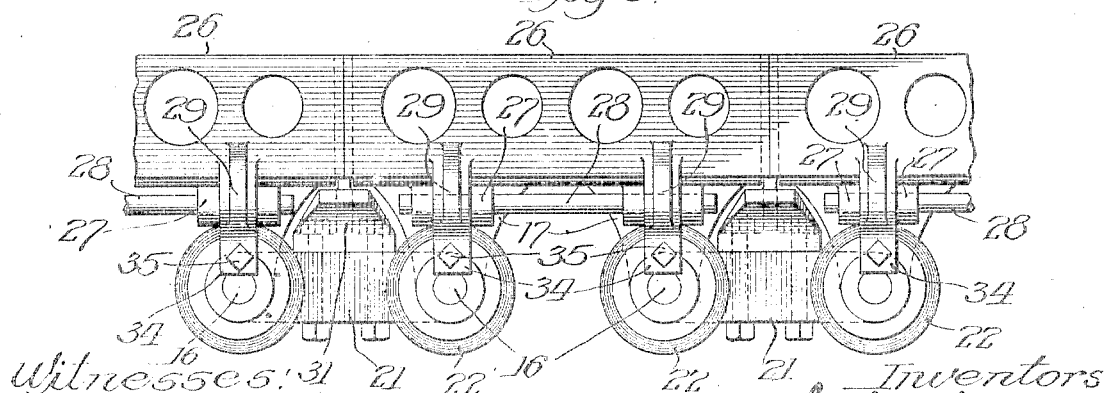

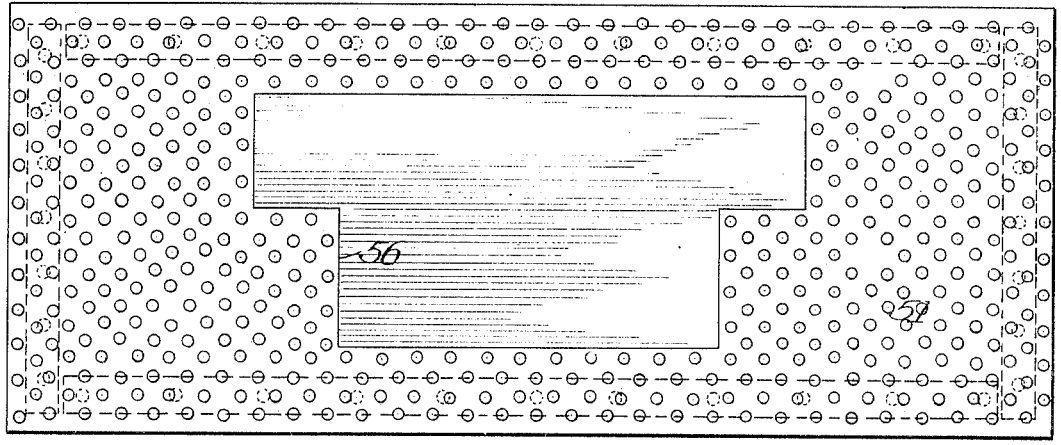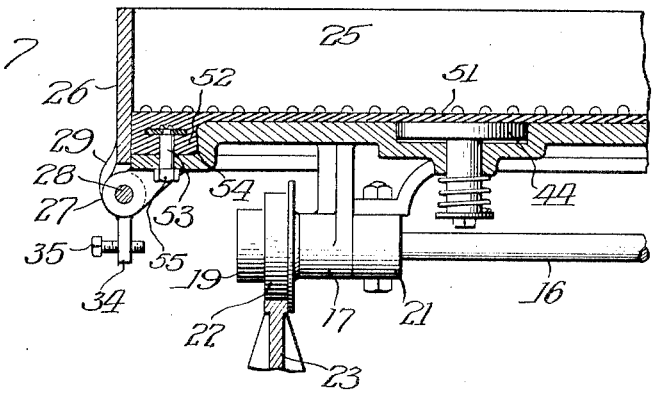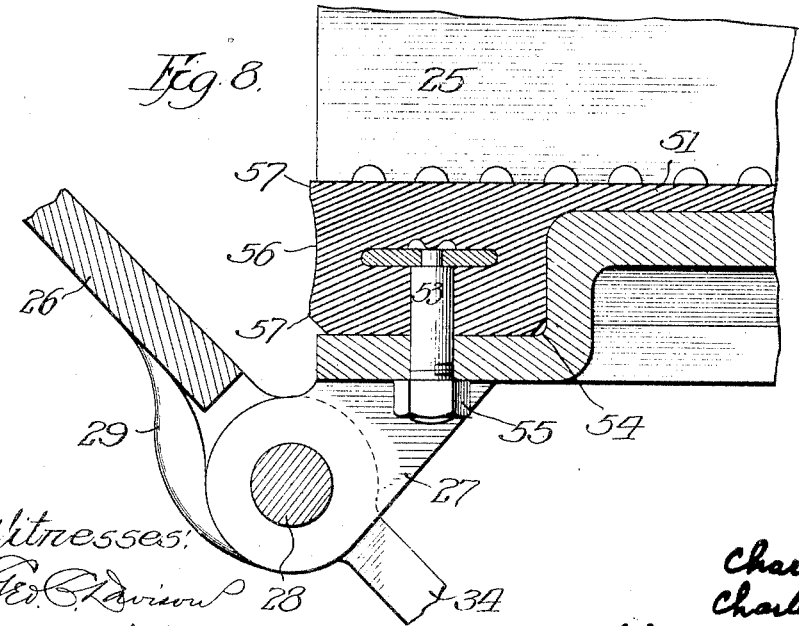

C. R. BIRDSEY & C. F. HENNING.
PLASTER BLOCK MOLDING MACHINE.
APPLICATION FILED APR. 29, 1912.
1,116,669.
Patented Nov. 10, 1914.
5 SHEETS—SHEET 5.
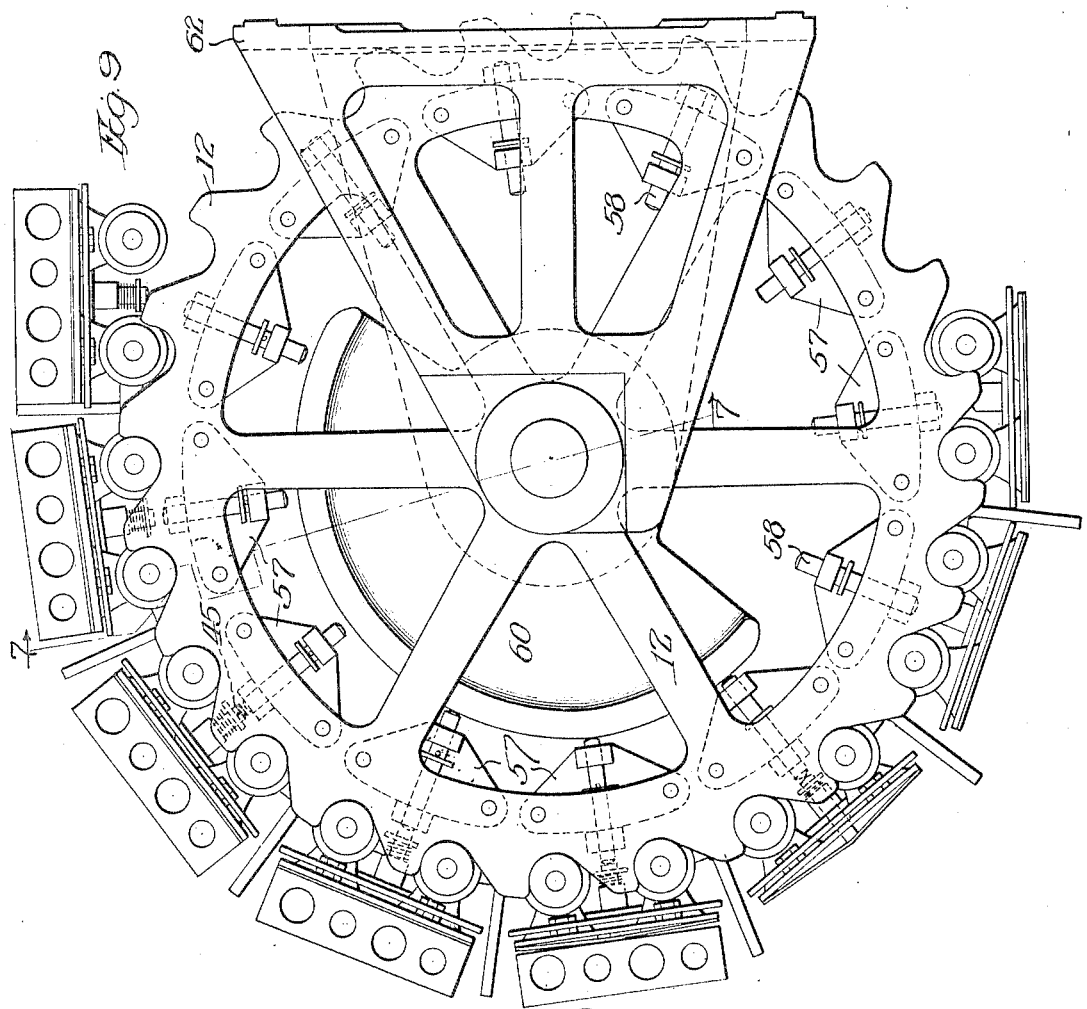
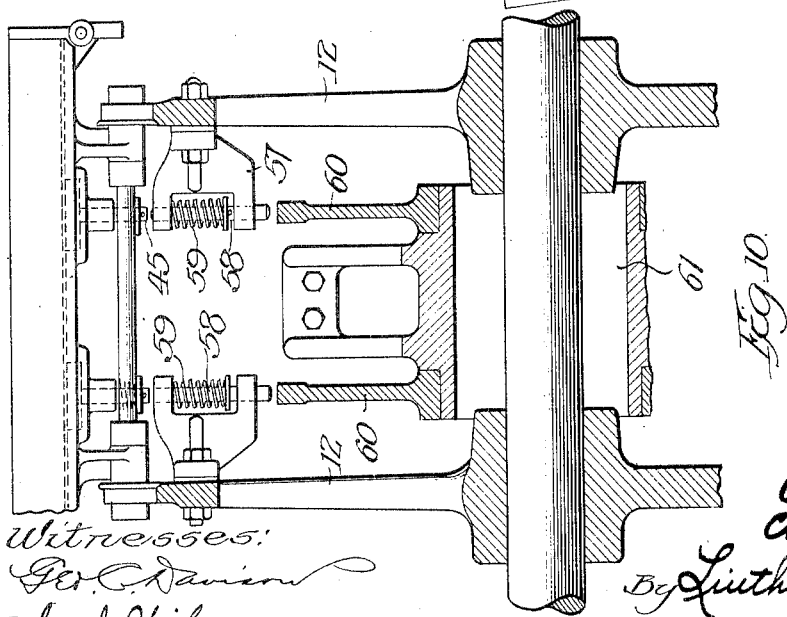

UNITED STATES PATENT OFFICE.

CHARLES R. BIRDSEY AND CHARLES F. HENNING, OF CHICAGO, ILLINOIS, ASSIGNORS TO THE UNITED STATES GYPSUM COMPANY, OF CHICAGO, ILLINOIS, A CORPORATION OF NEW JERSEY.

PLASTER-BLOCK-MOLDING MACHINE.

1,116,669.    Specification of Letters Patent.    Patented Nov. 10, 1914.

Application filed April 29, 1912. Serial No. 693,796.

*To all whom it may concern:*

Be it known that we, CHARLES R. BIRDSEY and CHARLES F. HENNING, citizens of the United States, residing at Chicago, in the county of Cook and State of Illinois, have invented certain new and useful Improvements in Plaster-Block-Molding Machines, of which the following is a specification.

This invention pertains to plaster block molding machines and has for its primary object the provision of a machine in which blocks of stucco or plaster of Paris mixtures for building purposes and the like may be molded accurately, speedily and economically.

Another object of the invention is the provision of a machine in which the molds are automatically closed before being filled and are automatically opened after the blocks of plastic material have set so that the blocks may be readily removed therefrom and, also, to provide means for loosening the blocks from the bottoms of the molds.

Other objects and advantages of the present invention will be apparent as it is better understood by reference to the following description when considered in connection with the accompanying drawings illustrating one preferred embodiment thereof.

Referring to the drawings—Figure 1 is a side elevation partially in section of a block molding machine embodying our invention; Fig. 2 is a vertical section taken substantially on the line 2—2 of Fig. 1; Fig. 3 is a plan view of one of the molds showing a portion of the bottom covering removed; Fig. 4 is a sectional view taken on the line 4—4 of Fig. 3; Fig. 5 is an enlarged fragmentary end elevation of the carrier and molds; Fig. 6 is a plan view of a mold bottom showing another form of covering sheet; Fig. 7 is a fragmentary sectional view similar to Fig. 4 but showing a mold equipped with the covering sheet shown in Fig. 6; Fig. 8 is an enlarged view of one end of the mold shown in Fig. 7; Fig. 9 is a side elevation of one end of the machine showing another form of mechanism for loosening the blocks from the bottoms of the molds; and Fig. 10 is a sectional view on the line 7—7 of Fig. 6.

From the drawings it will be observed that at each end of the main frame 11 of the machine a pair of large sprocket wheels 12 and 13 are mounted on suitable cross shafts 14 and 15, respectively. The length of the frame and the distance between the sprocket wheels may vary in different machines, depending to a considerable extent upon the size of the blocks to be molded and the rapidity with which the machines run but, ordinarily, the frame will be from 100 to 250 feet in length. An endless carrier carrying a plurality of molds is trained to travel around the sprocket wheels, any suitable driving mechanism being employed for effecting an intermittent or constant travel of the carrier.

The carrier comprises a plurality of transversely extending rods or shafts 16 mounted in pairs in suitable bearings 17 fixed to the mold bottoms 18. Longitudinal movement of the shafts in the bearings is prevented by end collars 19 and by links 21 secured on the shafts between the bearings. It will be obvious from an inspection of Fig. 5 that each mold bottom with its downwardly projecting bearings 17 and the shafts 16 mounted therein forms, in effect, a rigid truck and the adjacent trucks are connected together by the links 21 fixed at each end to the rod shafts 16. Suitable wheels 22 are mounted on the shafts 16 and are adapted to travel between the sprocket wheels 12 and 13 upon tracks 23 and 24 supported upon the frame of the machine, these tracks being adapted to support the weight of the carrier between the sprocket wheels.

Each of the molds in which the plaster blocks are formed comprises the bottom 18 supported from a pair of the shafts 16 by the bearings 17 and the side walls 25 and end walls 26 which are mounted as will now be described: The bottoms 18 are provided at their ends with bearings or lugs 27 adapted to receive a pivot rod 28 and the ends 26 are pivotally mounted on these rods by means of downwardly projecting bearing studs 29 fixed to the ends 26 and swingingly supported on the rods 28. The sides 25 are carried by brackets 31 fixed on the links 21 and when the molds are traveling in a straight line between the sprocket wheels each side forms a partition and a common side wall for adjacent molds, as shown in Figs. 1 and 5. When the molds, however, are traveling in a curved path around the sprocket wheels the side walls assume radial positions and the mold bottoms assume tangential positions relatively to the sprocket wheels so that the mold bottoms and the side walls are separated from each other as shown in Fig. 1.

A mixing device 32, supply hopper, or any other suitable supply means, is mounted above the carrier in position to fill the molds consecutively with plastic material as they travel along. It is, of course, desirable that the molds be closed when they receive their charge of plastic material and, therefore, we have provided means for holding the end walls in vertical or closed position from a time prior to the charging of the molds until the blocks have set and nearly reached their discharge position. To this end a guideway or track 33 provided with a suitable hardened wear plate 33' is mounted adjacent the ends of the molds at the supply end of the machine and the end supporting lugs 29 are extended downwardly to provide projections or arms 34 adapted to be engaged by the guide 33 to hold the ends in closed position. The arms 34 are preferably equipped with set-screws 35 which are threaded therethrough so that their inner ends may engage with the guide 33'. Suitably curved guides or cam members 36 are mounted on the lower part of the machine frame in position to engage with the mold ends 26 and force them into closed position, as shown in Figs. 1 and 2. The lower travel of the carrier moves toward the right, viewing Fig. 1, and, it will be manifest, that as each mold reaches a position opposite the curved guides 36, the mold ends will be brought into engagement with the guides and swung on their pivots to vertical or closed position. This closing movement of the ends takes place just before the molds reach the beginning of the guide 33 so that the projecting arms 34 will always be outside the guide 33 and the ends will be held in closed position throughout the length of the guide 33 by engagement of the inner ends of the adjusting screws 35 therewith. The tightness of the mold ends can, of course, be regulated by adjusting the screws 35 and they may be further adjusted to take up the wear thereon, as required. The mold ends are, therefore, held in closed position at the time that each mold receives its charge from the supply device 32 and, since the molds at this point are traveling in a straight line, the sides 25 have a contact fit with the side edges of the mold bottoms and the mold is accordingly closed to produce a box-like structure adapted to contain the charge of plastic material.

After the mold ends have been closed and before the charge is introduced to the mold the cores 37 are inserted into the mold as shown in Fig. 2. The number and size of the cores employed in each particular mold will depend upon the size of the mold and the material of which the block is composed, the purpose of the cores being to provide holes or cores through the blocks to lighten them. The charge of plastic material which is delivered to the mold from the supply device 32 fills the interior of the mold around the cores and the material sets or hardens as the carrier travels along so that by the time the mold reaches the opposite end of the machine the blocks may be removed therefrom. The cores, of course, are withdrawn before the blocks are removed or the mold opened.

In order to facilitate the removal of the blocks it is desirable to separate the ends and side walls of the molds and, for the purpose of swinging the end walls outwardly, the guide 33 is constructed to terminate at 38 (Fig. 1) the end being turned inwardly at this point. Another guide device 39 overlaps the end 38 of the device 33 and is spaced therefrom so that it engages the outer faces of the projections 34. The device 39 is curved inwardly and upwardly from its overlapping end so that the engagement of the projections 34 therewith will cause the mold ends 26 to swing away from the block 41 into horizontal position as shown in Fig. 1. As the mold reaches the sprocket wheel 12 the side walls 25 are separated from the block by the curvature of the wheel which causes a radial movement of the sides relatively to the mold bottom and also separates the sides from the bottom, as previously described. It will be obvious, therefore, that by the time the block has traveled a short distance around the wheel 12 both the end walls and side walls of the mold will have been separated from the block so that they will not interfere with its ready removal from the mold.

For the purpose of freeing the block from the bottom of the mold and facilitating its ready removal we prefer to cover the bottom of each mold with a sheet 42 of rubber or other flexible material, best shown in Figs. 3 and 4, the marginal edges of which are fixed to the bottom 18 around the periphery. The sheet is free to be flexed or separated from the bottom at all points within the margins. The bottom 18 is provided with sockets or depressions 43 in which are disposed plates or plungers 44 having extensions 45 protruding through perforations in the bottoms of the recesses. Coiled expansion springs 46 normally retain the plates in their depressed position, as shown in Fig. 4. When the side and end walls of the molds have been separated the plates 44 are elevated by suitable mechanism which tends to free the block from the sheet 42 which forms the bottom of the mold, because the plates 44 warp the flat surface of the sheet 42, breaking the adhesive bond between the molded block and the flexible sheet 42, as best shown in Figs. 1 and 9. Various mechanisms for elevating the plates 44 may be employed, one form illustrated in Fig. 1 being shown as comprising a series of radial spindles 47 mounted between the wheels 12 in alinement with the ends of the plungers and connected at their inner ends to an eccentric ring 48 encircling a fixed eccentric 49. As the wheels 12 revolve the spindles 47 will be successively projected into engagement with the plungers 45 to elevate the plates 44, thereby loosening the blocks from sheet 42 which forms the bottoms of the molds and the blocks may thereupon be readily lifted out of the molds and stacked or piled up in any convenient place.

In Figs. 6 to 8, inclusive, we have disclosed one practical construction of the rubber sheet covering the bottom of the mold and its manner of attachment to the mold. The sheet 51 in this instance is provided with a thickened margin 52 in which bolts 53 are embedded at intervals with their threaded ends projecting downwardly for insertion through suitable apertures in the mold bottom which is formed to provide a peripheral depression or groove 54 to receive the thickened margin 52. The sheet is rigidly fixed to the mold bottom around its edges by nuts 55 threaded onto the lower ends of the bolts 53. The sheet is free from the mold bottom within the margins so that it may be warped or elevated above the bottom by the plungers 44, as previously described. The elevation or warping of the flexible sheet serves to break the suction between the sheet and the plastic block so that the block may be readily removed. The upper surface of the sheet 51 is preferably roughened to provide indentations in the completed block and, if desired, letters, characters, or advertising matter may be formed on the sheet to be reproduced on the face of the block. In Fig. 6 that portion of the sheet bounded by the lines 56 is designed to be provided with characters or advertising matter but, obviously, this matter may be omitted, if preferred.

The plastic material with which the molds are charged or filled comprises a considerable amount of water and it is, therefore, desirable that the edges of the mold fit tightly to prevent the water from escaping. To this end the edges of the flexible sheet 51 are concaved, as indicated at 56, and the corners 57 at the top and bottom of the concavity project beyond the periphery of the mold bottom. When the sides and ends 25 and 26 are forced tightly against the edges of the mold bottom in their closing movements the corners 57 are compressed and a water-tight joint or seal is thereby formed between the sheet 51 and the sides and ends of the mold.

In Figs. 9 and 10 we have shown a slightly modified form of mechanism for operating the plungers 45. In this instance a series of brackets 57 are mounted within the peripheries of the wheels 12 and in these brackets, in alinement with the plungers 45, we have positioned a series of operating rods 58 normally retained in depressed or inoperative position by coiled springs 59. A plurality of fixed cam members 60 are disposed in the path of travel of the inner ends of the operating rods 58 so that as these rods travel around the wheel they are brought successively into engagement with the cams 60 whereupon the rods 58 are pushed outwardly into engagement with the plungers 45 to project the plates 44 and warp the flexible sheet disposed thereover. The cams 60 may be mounted in any preferred manner but we have shown them, for purposes of illustration, as encircling the hubs 61 of the wheels 12 and provided with a rearward extension 62 fixed to the frame of the machine. It will thus be obvious that the blocks are freed from the side walls, the end walls and the bottoms of the molds at wheels 12 and provided with an rearward the time or before they reach discharge position, so that they may be freely removed from the molds when they reach the proper position. The mold ends are held in open or horizontal position upon the lower travel of the carrier by the guide 39 until the closing device 36 is reached whereupon they are closed by this device and are held in closed position upon further travel by the guide 33.

The plastic material has a tendency to stick to the side and end walls 25 and 26 of the molds and we have, therefore, provided means for cleaning these walls each time after a mold has been used. To this end we mount a plurality of pipes 63 beneath the carrier which are equipped with nozzles 64 positioned to discharge streams of water against the faces of the mold walls. The water is discharged from the nozzles with considerable force and would tend to wear and deteriorate the rubber bottoms of the molds if permitted to play against them, consequently, the nozzles are so positioned that they will discharge into the corners of the molds but not against the bottoms thereof. As the carrier travels along the jets of water will wash faces of the side walls from bottom to top and also the end walls from end to end, thereby removing any plastic material which might have a tendency to adhere thereto and thoroughly cleansing the molds for the reception of fresh charges.

It is believed that our invention and its mode of operation will be understood from the foregoing without further description and, while we have shown and described those embodiments of our invention which appear to be preferable at the present time, it will be obvious to those skilled in the art that considerable modification in the structural details may be resorted to within the scope of the following claims and without departing from the spirit of the invention or sacrificing any of the material advantages thereof.

We claim:

1. In a plastic block molding machine, an endless carrier, a series of molds upon the carrier, each provided with a bottom and sides movable with respect thereto, means for opening the molds to permit the discharge of the molded blocks, a flexible lining mounted upon the bottom of each mold, means for flexing said lining to break the bond between the lining and the molded block preparatory to discharging the block, and means for closing the molds after the discharge of the blocks.

2. In a plastic block molding machine, an endless carrier, a series of molds on the carrier, each provided with a bottom and sides movable with respect thereto, a lining for the bottom of each mold, said lining being provided around its periphery with a sealing strip disposed to be compressed by the sides of the molds when in their closed position to form a fluid-tight joint between the bottom and the sides of the molds, means for moving the sides of the molds to free said sides from the molded blocks, and means for returning the sides of the molds to their normal positions after the discharge of the blocks.

3. In a plastic block molding machine, an endless carrier, a series of molds upon the carrier, each provided with a rigid bottom, a flexible lining for the bottom of each mold, and means for flexing said lining to break the bond between the lining and the molded block during the travel of the carrier preparatory to discharging the block from the mold.

4. In a plastic block molding machine, an endless carrier, a series of molds on the carrier, each having a rigid bottom with an opening therein, a flexible lining for the bottom of each of the molds, plungers working through the openings in said bottom, and means for automatically actuating the plungers preparatory to discharging the molded blocks.

5. In a plastic block molding machine, an endless carrier running over spaced driving wheels, a series of molds upon the carrier, a flexible lining for the bottom of each mold, each lining being secured to the bottom of its mold around the edges of the lining, the intermediate portion of the lining being free from the mold, a plunger working through the bottom of each mold in coöperative relation with the lining to flex the same, and means located at one end of the machine in coöperative relation with the plungers for actuating the same when the molds pass around the driving wheels at said end of the machine, whereby the linings will be flexed to break the bonds between the molded blocks and the linings preparatory to discharging the blocks.

6. In a plastic block molding machine, a traveling endless carrier, a series of molds upon the carrier, a flexible lining for the bottom of each mold, and means operating during the travel of the carrier for flexing said linings to break the bond between the lining and the molded block preparatory to discharging the block from the mold.

7. In a plastic block molding machine, an endless carrier, a series of rigid molds, a flexible lining for the bottom of each mold, and automatically operated means for flexing said lining to break the bond between the lining and the molded block.

8. A mold having a rigid bottom provided with a flexible lining secured around its margin, the portion of the lining bounded by the secured portion thereof being free from the bottom of the mold and capable of being flexed to break the bond between the lining and the molded block.

9. A mold having a rigid bottom provided with a marginal depression, and a flexible lining having a thickened portion secured in said depression, the portion of the lining bounded by the thickened portion being free from the mold bottom and capable of being flexed to break the bond between said lining and a molded block.

10. A rigid mold having a flexible lining disposed over the bottom thereof and secured adjacent its periphery to the bottom of the mold, the edges of said lining projecting beyond the edges of the mold bottom to form a seal in conjunction with the sides of said mold, the portion of the lining bounded by the part which is secured to the mold bottom being free from the mold bottom and capable of being flexed to break the bond between said lining and a molded block.

11. In a machine of the character described, the combination of a mold support, a plurality of molds mounted thereon, each consisting of a bottom and sides movable with respect thereto, and means attached to said bottom and engaging said sides when in closed position to form therewith a fluid-tight joint.

12. In a machine of the character described, a movable support, a plurality of molds carried by the support, each consisting of a rigid bottom and sides movable with respect thereto, a flexible medium attached to said bottom, and automatic means operating in conjunction with the support for flexing the said medium at one portion of its travel preparatory to discharging the contents of the molds.

13. In a machine of the character described, the combination of a movable support, a series of molds mounted on said support, each consisting of a rigid bottom and sides movable with respect thereto, a compressible medium mounted upon said bottom and extending beyond the edges thereof to engage the said sides when in closed position to form therewith a fluid-tight joint.

14. In a plastic block molding machine, an endless carrier, a series of molds upon the carrier, each provided with a bottom and sides movable with respect thereto, means carried by the frame for positively moving the sides to open position, a flexible lining upon the bottom of each mold, means for flexing said lining to break the bond between the lining and the molded block preparatory to discharging the block, and means mounted on the frame for subsequently and positively moving the sides to closed position preparatory to recharging.

15. In a plastic block molding machine, an endless carrier, a series of molds upon the carrier, each provided with a bottom and sides movable with respect thereto, means carried by the frame for positively moving the sides to open position, a flexible lining mounted upon the bottom of each mold, means for flexing said lining to break the bond between the lining and the molded block preparatory to discharging the block, means mounted on the frame for subsequently and positively moving the sides to closed position preparatory to recharging the molds, and means mounted on the frame for positively holding the sides in closed position.

16. In a plastic block molding machine, an endless carrier, a series of molds upon the carrier, each provided with a bottom and sides movable with respect thereto, means carried by the frame for positively moving the sides to open position, a flexible lining mounted upon the bottom of each mold, means for flexing said lining to break the bond between the lining and the molded block preparatory to discharging the block, means mounted on the frame for subsequently and positively moving the sides to closed position preparatory to recharging the molds, and adjustable means for positively holding the sides in closed position.

CHARLES R. BIRDSEY.
CHARLES F. HENNING.

Witnesses:
WM. H. BELT,
M. A. KIDDIE.